(12) United States Patent
Thomassin et al.

(10) Patent No.: US 9,181,863 B2
(45) Date of Patent: Nov. 10, 2015

(54) INTERNAL COMBUSTION ENGINE WITH PORT COMMUNICATION

(71) Applicant: Pratt & Whitney Canada Corp., Longueuil (CA)

(72) Inventors: Jean Thomassin, Ste-Julie (CA); Patrick Rousseau, Varennes (CA); Eric-Pierre Martel, St-Jean-sur-Richelieu (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 0 days.

(21) Appl. No.: 13/799,965

(22) Filed: Mar. 13, 2013

(65) Prior Publication Data

US 2014/0261292 A1    Sep. 18, 2014

(51) Int. Cl.
| | |
|---|---|
| F02B 33/44 | (2006.01) |
| F02B 53/00 | (2006.01) |
| F01C 1/02 | (2006.01) |
| F02B 57/04 | (2006.01) |
| F01C 1/22 | (2006.01) |
| F02B 29/02 | (2006.01) |

(52) U.S. Cl.
CPC . *F02B 57/04* (2013.01); *F01C 1/22* (2013.01); *F02B 29/02* (2013.01)

(58) Field of Classification Search
CPC .......... F02B 37/00; F02B 53/04; F02B 53/00; F02B 2053/005; F04C 2250/10; Y02C 10/17
USPC .............. 123/207, 216, 242, 559.1; 418/61.2, 418/206.4, 15
See application file for complete search history.

(56) References Cited

U.S. PATENT DOCUMENTS

| | | | | | |
|---|---|---|---|---|---|
| 4,562,803 | A | * | 1/1986 | Tadokoro et al. | 123/242 |
| 4,562,805 | A | * | 1/1986 | Tadokoro et al. | 123/242 |
| 4,566,412 | A | * | 1/1986 | Tadokoro et al. | 123/242 |
| 4,614,173 | A | * | 9/1986 | Okimoto et al. | 123/242 |
| 4,627,395 | A | * | 12/1986 | Tadokoro et al. | 123/242 |
| 4,706,621 | A | * | 11/1987 | Okimoto et al. | 123/242 |
| 4,750,458 | A | * | 6/1988 | Yoshioka et al. | 123/242 |
| 4,756,284 | A | * | 7/1988 | Okimoto et al. | 123/242 |
| 4,759,324 | A | * | 7/1988 | Kita et al. | 123/242 |

(Continued)

FOREIGN PATENT DOCUMENTS

| | | |
|---|---|---|
| DE | 3633776 | 4/1987 |
| GB | 2144489 | 3/1985 |
| JP | 2001-55924 | 2/2001 |

*Primary Examiner* — Thai Ba Trieu
*Assistant Examiner* — Ngoc T Nguyen
(74) *Attorney, Agent, or Firm* — Norton Rose Fulbright Canada (57) ABSTRACT

An internal combustion engine with rotatable bodies each received in a respective internal cavity. The engine includes at least one inlet port for each internal cavity in fluid communication with the combustion chamber(s) thereof at least during their intake phase and a beginning of their compression phase. The bodies are angularly offset with the beginning of the compression phase of the combustion chamber(s) defined by each body being simultaneous with at least a beginning of the intake phase of the combustion chamber(s) defined by a different one of the bodies. A respective conduit provides a fluid communication between an inlet port for each body and an inlet port for the different one of the bodies, with each conduit being in fluid communication with a plenum for receiving pressurized air. A method of feeding air to an internal combustion engine is also provided.

17 Claims, 5 Drawing Sheets

(56) References Cited

U.S. PATENT DOCUMENTS

| | | |
|---|---|---|
| 5,054,439 A * | 10/1991 | Akagi et al. ................ 123/216 |
| 6,343,473 B1 | 2/2002 | Kanesaka |
| 6,651,618 B1 | 11/2003 | Coleman et al. |
| 6,745,739 B2 * | 6/2004 | Fujihira et al. ........... 123/184.21 |
| 6,843,231 B1 | 1/2005 | Duffy et al. |
| 7,347,171 B2 | 3/2008 | Leman et al. |
| 7,640,901 B2 | 1/2010 | Aoyama et al. |
| 7,753,036 B2 | 7/2010 | Lents et al. |
| 7,841,324 B2 | 11/2010 | Dirker et al. |

* cited by examiner

INTERNAL COMBUSTION ENGINE WITH PORT COMMUNICATION

TECHNICAL FIELD

The application relates generally to internal combustion engines and, more particularly, to such engines operating under the principle of the Miller cycle.

BACKGROUND OF THE ART

Internal combustion engines operating under the principle of the Miller cycle usually have an open inlet port during the beginning of the compression phase of the combustion chamber(s). In a reciprocating engine, the Miller cycle may be obtained through timing of the opening of the inlet valve. In a rotary engine such as a Wankel engine, the Miller cycle may be obtained through proper positioning of the inlet port. The Miller cycle engine usually has a volumetric compression ratio lower than its volumetric expansion ratio.

Typically, the Miller cycle engine is used with a turbocharger to prevent loss of air during the beginning of the compression phase and to increase the pressure compression ratio. However, during the beginning of the compression phase when the inlet port is open, compression must be typically performed against the pressure of the turbocharger, which usually creates pressure losses.

SUMMARY

In one aspect, there is provided an internal combustion engine comprising: at least two rotatable bodies; an outer body defining a respective internal cavity for each of the bodies, each of the bodies being sealingly and rotationally received within the respective internal cavity to each define at least one combustion chamber of variable volume undergoing a cycle defining successive phases of intake, compression, combustion and exhaust; at least one inlet port for each respective internal cavity, the at least one inlet port being in fluid communication with each of the at least one combustion chamber of the respective internal cavity at least during the intake phase thereof and a beginning portion of the compression phase thereof; at least one exhaust port for each respective internal cavity, the at least one exhaust port being in fluid communication with each of the at least one combustion chamber of the respective internal cavity during the exhaust phase thereof; a rotatable shaft, the bodies being drivingly engaged to the shaft in an angularly offset manner with the beginning portion of the compression phase of the at least one combustion chamber defined by each of the bodies being simultaneous with at least a beginning of the intake phase of the at least one combustion chamber defined by a different one of the bodies; a plenum for receiving pressurized air; and a respective conduit providing a fluid communication between the at least one inlet port of the respective internal cavity of each of the bodies and the at least one inlet port of the respective internal cavity of the different one of the bodies, each respective conduit being in fluid communication with the plenum.

In another aspect, there is provided an engine comprising: a turbocharger having a compressor; a rotary internal combustion engine having: at least two rotors, an outer body defining: a respective internal cavity for each of the rotors, each of the rotors being sealingly and rotationally received within the respective internal cavity to define a plurality of combustion chambers of variable volume each undergoing a cycle defining successive phases of intake, compression, combustion and exhaust, a primary inlet port for each respective internal cavity, the primary inlet port being in fluid communication with each of the at least one combustion chamber of the respective internal cavity during the intake phase thereof and a beginning portion of the compression phase thereof; a secondary inlet port for each respective internal cavity, the secondary inlet port being in fluid communication with each of the at least one combustion chamber of the respective internal cavity during a secondary portion of the cycle thereof extending at most over a beginning of the intake phase and an end of the exhaust phase, and an exhaust port for each respective internal cavity, the exhaust port being in fluid communication with each of the combustion chambers of the respective internal cavity during the exhaust phase thereof; a rotatable shaft, the rotors being drivingly engaged to the shaft in an angularly offset manner with the beginning portion of the compression phase of the at least one combustion chamber defined by each of the rotors being simultaneous with at least part of the secondary portion of the cycle of the combustion chambers defined by a different one of the rotors; a plenum in fluid communication with the compressor; and a respective conduit providing a fluid communication between the primary inlet port of the respective internal cavity of each of the rotors and the secondary inlet port of the respective internal cavity of the different one of the rotors, each respective conduit being in fluid communication with the plenum.

In a further aspect, there is provided a method of feeding air to an internal combustion engine having at least first and second internal cavities each sealingly and rotationally receiving a respective rotor therewithin, each of the internal cavities having a primary inlet port and a secondary inlet port in fluid communication therewith, the method comprising: feeding compressed air to a combustion chamber of the first cavity through the primary inlet port thereof while increasing a volume of the combustion chamber until a maximum volume thereof is reached; while reducing a volume of the combustion chamber from the maximum volume and at least in part while increasing a volume of a combustion chamber of the second cavity, feeding compressed air from the combustion chamber of the first cavity through the primary inlet port thereof into the combustion chamber of the second cavity through the secondary inlet port thereof; closing a communication between the primary inlet port and the combustion chamber of the first cavity and further reducing the volume of the combustion chamber of the first cavity until a minimum volume thereof is reached; and feeding compressed air to the combustion chamber of the second cavity through the primary inlet port thereof while increasing the volume of the combustion chamber of the second cavity until a maximum volume thereof is reached.

DESCRIPTION OF THE DRAWINGS

Reference is now made to the accompanying figures in which.

DETAILED DESCRIPTION

Figure 1:
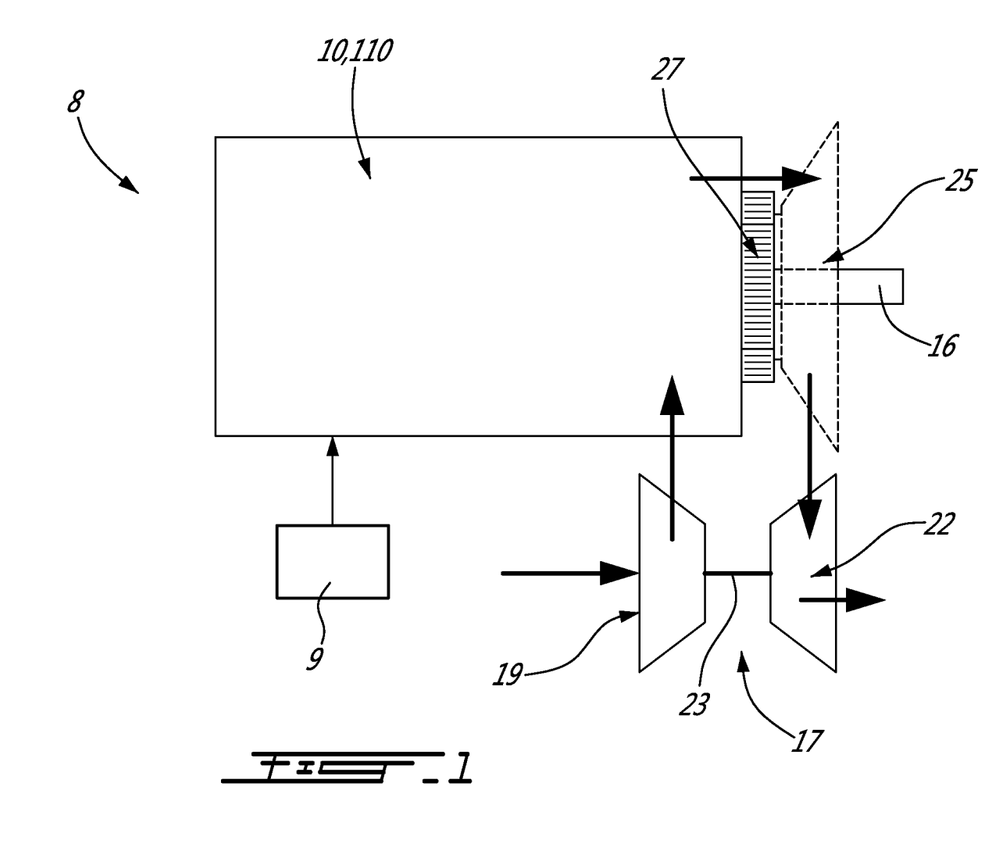
FIG. 1 is a schematic view of an engine in accordance with a particular embodiment.

Referring now to FIG. 1, an engine 8 is schematically shown. The engine 8 includes an internal combustion engine 10, 110 generally including a plurality of moveable bodies each received in a corresponding internal cavity of an outer body to each define at least one combustion chamber. For example, the internal combustion engine 10, 110 may be a reciprocating engine with a plurality of internal cavities each receiving a moveable body in the form of a reciprocating piston. The internal combustion engine 10, 110 may alternately be a rotary engine with a plurality of internal cavities each receiving a moveable body on the form of a rotatable body or rotor. The moveable bodies drive a common load. In the embodiment shown, the common load includes an output shaft 16 which may be for example connected to a propeller through a reduction gearbox (not shown) and to which the moveable bodies of the internal combustion engine 10, 110 are engaged.

The engine 8 also includes a turbocharger 17, which in the embodiment shown include a compressor 19 and a turbine 22 which are drivingly interconnected by a shaft 23. The compressor 19 and the turbine 22 may each be a single-stage device or a multiple-stage device with a single shaft or split on multiple independent shafts in parallel or in series, and may be a centrifugal or axial device. In the embodiment shown, the shaft 23 of the turbocharger 17 rotates independently of the common load. The compressor 19 of the turbocharger 17 compresses the air before it enters the internal combustion engine 10, 110.

In a particular embodiment, the engine 8 is a compound cycle engine such as described for example in Lents et al.'s U.S. Pat. No. 7,753,036 issued Jul. 13, 2010, as described in Julien et al.'s U.S. Pat. No. 7,775,044 issued Aug. 17, 2010, or as described in U.S. patent application Ser. Nos. 13/554,517 and 13/554,564 both filed Jul. 20, 2012, the entire contents of all of which are incorporated by reference herein. For example, the exhaust flow is supplied to a power turbine 25 also driving the common load. The power turbine 25 is connected to the output shaft 16 through an appropriate type of transmission 27, for example a planetary, star, offset or angular gear system. The outlet of the power turbine 25 is in fluid communication with an inlet of the turbocharger turbine 22. Energy is extracted from the exhaust gas exiting the power turbine 25 by the turbocharger turbine 22 to drive the compressor 19 via the connecting shaft 24.

In another embodiment, the internal combustion engine 10, 110 is not compounded and the power turbine 25 is omitted. For example, the engine 8 may include only the internal combustion engine 10 and a turbocharger 17. The internal combustion engine 10, 110 operates under the principle of the Miller cycle, as will be further detailed below.

Figure 2:
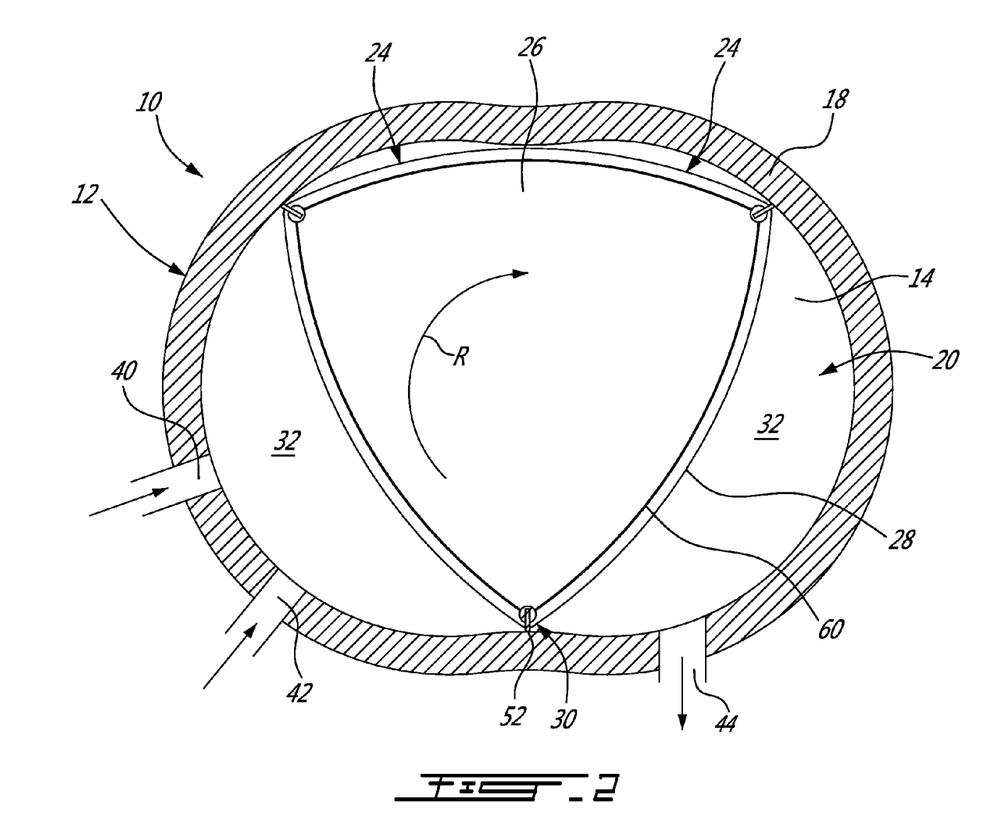
FIG. 2 is a schematic cross-sectional view of a rotary internal combustion engine in accordance with a particular embodiment, which can be used in an engine such as shown in FIG. 1.

Referring to FIG. 2, in a particular embodiment, the internal combustion engine 10 is a rotary engine. Although FIG. 2 shows a Wankel engine, it is understood that the rotary engine 10 may alternately have a different configuration than that of a Wankel engine. For example, in a particular embodiment, the rotary engine may be a single or eccentric type rotary engine in which the rotor rotates about a fixed center of rotation. For example, the rotary engine may be a sliding vane engine, such as described in U.S. Pat. No. 5,524,587 issued Jun. 11, 1996 or in U.S. Pat. No. 5,522,356 issued Jun. 4, 1996, the entire contents of both of which are incorporated by reference herein. In another particular embodiment, the rotary engine may be an oscillatory rotating engine, including two or more rotors rotating at different angular velocities, causing the distance between portions of the rotors to vary and as such the chamber volume to change. In another particular embodiment, the rotary engine may be a planetary rotating engine having a different geometry than that of the Wankel engine, such as for example a planetary engine having an internal cavity with an epitrochoid profile defining three lobes and a rotor with four apex portions. Examples of such non-Wankel rotary engines are shown in Applicant's U.S. application Ser. No. 13/750,523 filed Jan. 25, 2013, the entire contents of which is incorporated by reference herein. Other rotary engine geometries are also possible.

Still referring to FIG. 2, in the particular embodiment shown, the rotary engine 10 comprises an outer body 12 having a plurality of rotor cavities 20 (only one of which is shown) each defined by axially-spaced end walls 14 and a peripheral wall 18 extending therebetween, with a rotor 24 received in each cavity 20. The inner surface of the peripheral wall 18 of each cavity 20 has a profile defining two lobes, which is preferably an epitrochoid.

The outer body 12 may be integral, containing all the rotor cavities 20, or alternately be defined by a plurality of body portions (separate from one another or interconnected), for example each defining a respective one of the cavities 20 and receiving a respective one of the rotors 24.

Each rotor 24 is received within the respective cavity 20, with the geometrical axis of the rotor 24 being offset from and parallel to the axis of the outer body 12. Each rotor 24 has axially spaced end faces 26 adjacent to the outer body end walls 14, and a peripheral face 28 extending therebetween. The peripheral face 28 defines three circumferentially-spaced apex portions 30 and a generally triangular profile with outwardly arched sides. The apex portions 30 are in sealing engagement with the inner surface of peripheral wall 18 to form three rotating working or combustion chambers 32 between the inner rotor 24 and outer body 12. A recess (not shown) is defined in the peripheral face 28 of the rotor 24 between each pair of adjacent apex portions 30, to form part of the corresponding chamber 32.

The combustion chambers 32 are sealed. Each rotor apex portion 30 has an apex seal 52 extending from one end face 26 to the other and protruding radially from the peripheral face 28. Each apex seal 52 is biased radially outwardly against the peripheral wall 18 through a respective spring. An end seal 54 engages each end of each apex seal 52, and is biased against the respective end wall 14 through a suitable spring. Each end face 26 of the rotor 24 has at least one arc-shaped face seal 60 running from each apex portion 30 to each adjacent apex portion 30, adjacent to but inwardly of the rotor periphery throughout its length. A spring urges each face seal 60 axially outwardly so that the face seal 60 projects axially away from the adjacent rotor end face 26 into sealing engagement with the adjacent end wall 14 of the cavity. Each face seal 60 is in sealing engagement with the end seal 54 adjacent each end thereof.

Although not shown, each rotor 24 is journaled on an eccentric portion of a shaft and includes a phasing gear coaxial with the rotor axis, which is meshed with a fixed stator phasing gear secured to the outer body co-axially with the shaft. The shaft rotates each rotor 24 and the meshed gears guide the rotor 24 to perform orbital revolutions within the respective internal cavity 20. The shaft rotates three times for each complete rotation of one rotor 24 as it moves around the respective internal cavity 20. Oil seals are provided around the phasing gear to prevent leakage flow of lubricating oil radially outwardly thereof between the respective rotor end face 26 and outer body end wall 14.

During each rotation of the rotor 24, each chamber 32 varies in volumes and moves around the internal cavity 20 to undergo cycles with each cycle including the four phases of intake, compression, expansion and exhaust, these phases being similar to the strokes in a reciprocating-type internal combustion engine having a four-stroke cycle.

For each cavity 20, a primary inlet port 40 is defined through one of the walls of the stator body 12 for admitting air in turn into each of the combustion chambers 32. In the embodiment shown, the primary inlet port 40 is a peripheral port defined as an opening through the peripheral wall 18. In another embodiment, the primary inlet port 40 may have a different configuration, for example be defined through one of the end walls 14, with another primary inlet port being optionally defined in the other one of the end walls 14. The primary inlet port 40 is in fluid communication with the turbocharger compressor 19 (see FIG. 1), as will be further detailed below. The primary inlet port 40 is in fluid communication with each combustion chamber 32 during the intake phase thereof and a beginning of the compression phase thereof. As such, the rotary engine 10 operates under the principle of the Miller cycle, with its volumetric compression ratio lower than its volumetric expansion ratio, and with the primary inlet port 40 remaining open, i.e. in communication with the chamber 32, during the beginning of the compression phase.

For each cavity 20, an exhaust port 44 is defined through one of the walls of the stator body 12 for discharge of the exhaust gases from the combustion chambers 32. In the embodiment shown, the exhaust port 44 is a peripheral port defined as an opening through the peripheral wall 18. In another embodiment, the exhaust port 44 may have a different configuration, for example be defined through one of the end walls 14, with another exhaust port being optionally defined in the other one of the end walls 14.

For each cavity 20, a secondary inlet port or purge port 42 is also defined through one of the walls of the stator body 12 for admitting air in turn into each of the combustion chambers 32. The secondary inlet port 42 is located rearwardly of the primary inlet port 40 and forwardly of the exhaust port 44 relative to the direction R of the rotor revolution and rotation. In the embodiment shown, the secondary inlet port 42 is a peripheral port defined as an opening through the peripheral wall 18. In another embodiment, the secondary inlet port 42 may have a different configuration, for example be defined through one of the end walls 14, with another secondary inlet port being optionally defined in the other one of the end walls 14. The secondary inlet port 42 is also in fluid communication with the turbocharger compressor 19 (see FIG. 1), as will be further detailed below. The secondary inlet port 42 is in fluid communication with each combustion chamber 32 during a portion of its cycle; this portion may include a beginning of the intake phase and/or an end of the exhaust phase.

In the present specification including the claims, "intake phase" is intended to refer to the portion of the cycle during which the chamber 32 is in communication with at least one inlet port 40, 42 and during which the volume of the chamber 32 increases such as to draw air therein, while "compression phase" is intended to refer to the portion of the cycle between the intake phase and the ignition phase during which the volume of the chamber 32 decreases, starting at the point in the cycle where the maximum chamber volume is reached after intake, regardless if actual air compression occurs. For example, in a particular embodiment, compression may be inexistent or minimal during the beginning of the compression phase when the primary inlet port 40 is open.

In use, through each rotation of the rotor 24, each chamber 32 is filled with compressed air through the primary inlet port 40 and the secondary inlet port 42 during its intake phase as its volume increases. The air is then further compressed as by reducing the volume of the rotating chamber 32, with the beginning of the compression phase being performed with the primary inlet port 40 still open, i.e. in communication with the chamber 32, the primary inlet port 40 closing during the compression phase. Once the air is further compressed, near minimum volume of the chamber 32, the ignition phase occurs: the air is mixed with fuel from a fuel source 9 (see FIG. 1) and the resulting air-fuel mixture is ignited. In a particular embodiment, the fuel is heavy fuel e.g. diesel, kerosene (jet fuel), equivalent biofuel, etc. Alternately, the fuel may be any other adequate type of fuel suitable for injection as described, including non-heavy fuel such as for example gasoline or liquid hydrogen fuel. The fuel is delivered such that the chamber 32 is stratified with a rich fuel-air mixture near the ignition source and a leaner mixture elsewhere, thus providing a so-called stratified charge arrangement, and the fuel-air mixture may be ignited within the housing any suitable ignition system known in the art. The rotary engine 10 may include a pilot subchamber (not shown) receiving the ignition system and a pilot injector injecting a portion of the fuel therein for ignition.

After ignition, the combustion gases expand and force the volume of the chamber 32 to increase. The combustion or exhaust gases exit the chamber 32 through the exhaust port 44 during the exhaust phase. At the end of the exhaust phase, the chamber 32 may communicate with both the secondary inlet port 42 and the exhaust port 44, and the air entering the chamber 32 through the secondary inlet port 42 may be used to purge remaining exhaust gases from the chamber 32.

Figure 3:
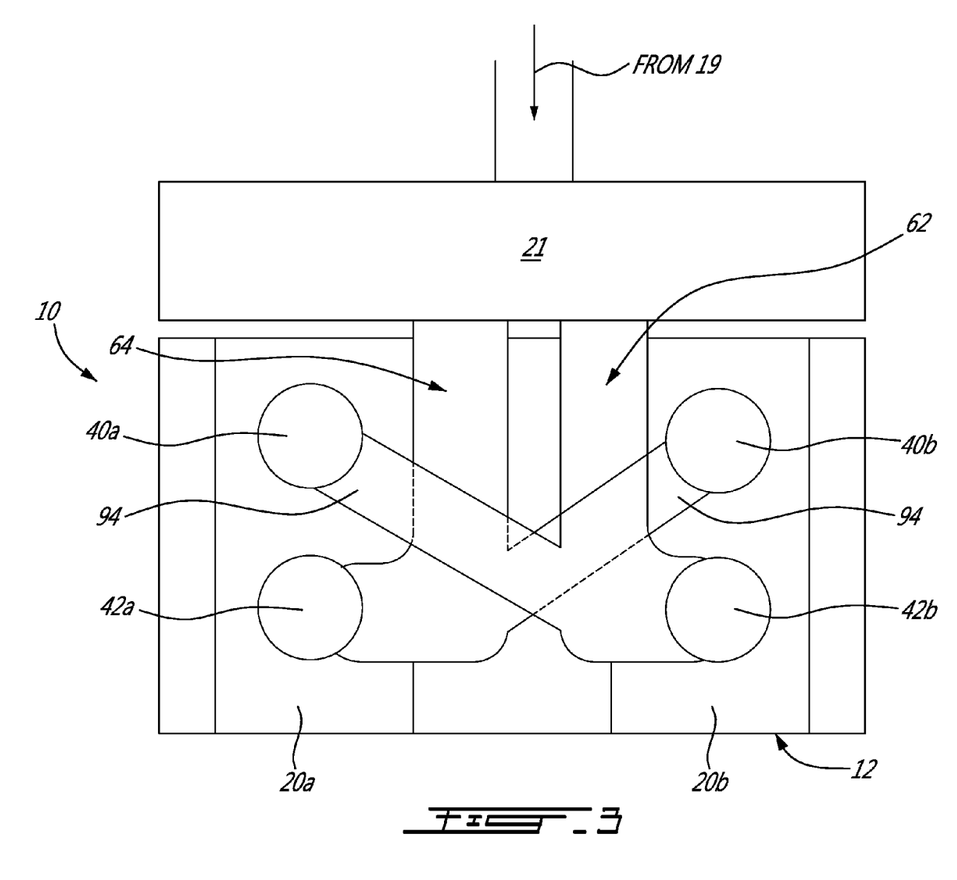
FIG. 3 is a schematic view of connections between the cavities of a rotary engine such as shown in FIG. 2, in accordance with a particular embodiment.

Referring to FIG. 3, a connection arrangement between the different cavities of the rotary engine 10 is shown. In the embodiment shown, the rotary engine 10 includes two rotor cavities 20a,b, each receiving a respective rotor 24 (not shown in FIG. 3) and each having a primary inlet port 40a,b and a secondary inlet port 42a,b in communication with the combustion chambers defined therein.

A first conduit 62 provides for fluid communication between the primary inlet port 40a of the first cavity 20a and the secondary inlet port 42b of the second cavity 20b. A second conduit 64 provides for fluid communication between the primary inlet port 40b of the second cavity 20b and the secondary inlet port 42a of the first cavity 20a. A plenum 21 receives the compressed air from the turbocharger compressor 19, and the first and second conduits 62, 64 are also in fluid communication with the plenum 21.

The rotors are engaged to the shaft in an angularly offset manner. Each combustion chamber defined in the first cavity 20a undergoes the beginning of its compression phase (i.e. the part of the compression phase where the primary inlet port 40a communicates with the chamber) while a corresponding combustion chamber defined in the second cavity 20b undergoes at least part of the portion of its cycle in communication with its secondary inlet port 42b, which in a particular embodiment is at the beginning of its intake phase. As such, the first conduit 62 allows for the compressed air overflowing from the primary inlet port 40a of the first cavity 20a during the beginning of its compression phase to be fed into the secondary inlet port 42b of the second cavity 20b, in a particular embodiment together with air from the plenum 21.

Similarly, each combustion chamber defined in the second cavity 20b undergoes the beginning of its compression phase (i.e. the part of the compression phase where the primary inlet port 40b communicates with the chamber) while a corresponding combustion chamber defined in the first cavity 20a undergoes at least part of the portion of its cycle in communication with its secondary inlet port 42a, which in a particular embodiment is at the beginning of its intake phase. As such, the second conduit 64 allows for the compressed air overflowing from the primary inlet port 40b of the second cavity 20b during the beginning of its compression phase to be fed into the secondary inlet port 42a of the first cavity 20a, in a particular embodiment together with air from the plenum 21.

In a rotary engine including more than two rotors, the rotor cavities may be connected in pairs, i.e. with the first and second conduits interconnecting the same rotor cavities, or connected with different rotor cavities, i.e. with the primary inlet port of a first rotor being connected to the secondary inlet port of a second rotor and the secondary inlet port of the first rotor being connected to the primary inlet port of a third rotor, based on the relative timing (angular offset) of the rotors.

Figure 4:
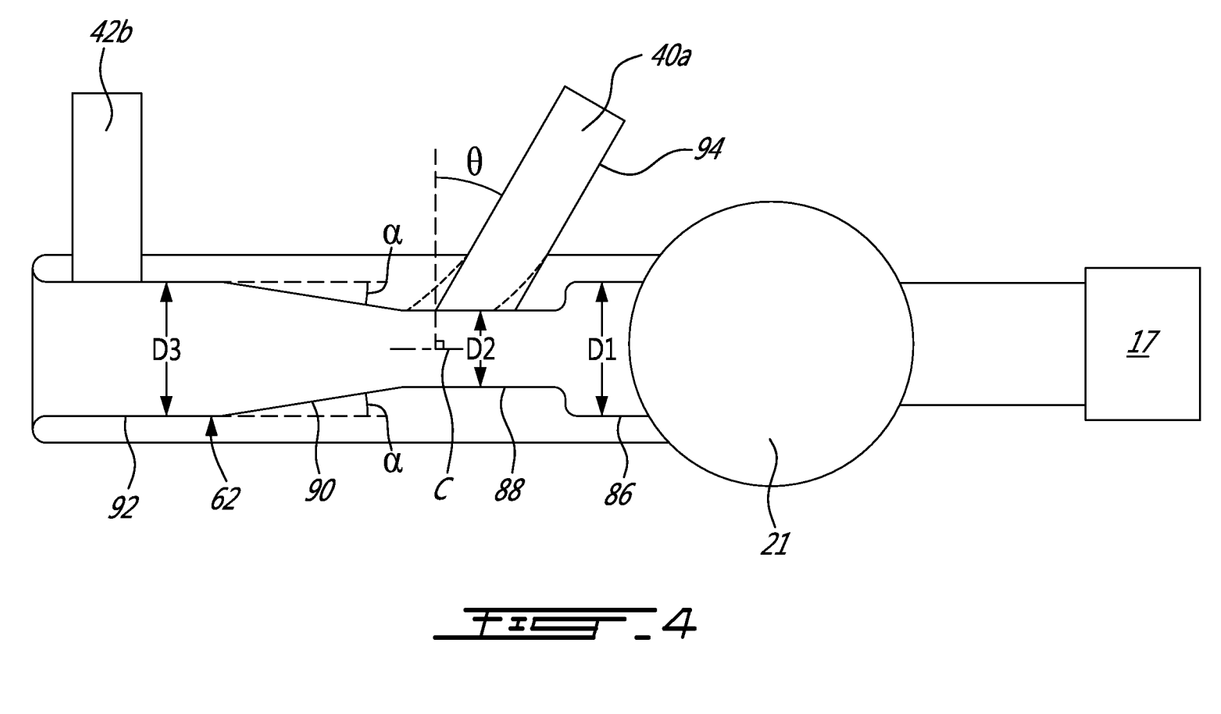
FIG. 4 is a schematic cross-sectional view of a conduit of FIG. 3, in accordance with a particular embodiment.

Referring to FIG. 4, a particular embodiment for the first conduit 62 is shown, with the second conduit 64 being identical or similar thereto. The conduit 62 is configured such as to form a Venturi to assist in the circulation of compressed air from the primary inlet port 40a of the first cavity 20a to the secondary inlet port 42b of the second cavity 20b. In a particular embodiment, the conduit 62 has a circular cross-section. The conduit includes a first segment 86 extending from the plenum 21. A second segment 88 extends from the first segment 86, and receives the connection with the primary inlet port 40a of the first cavity 20a. A third segment 90 extends from the second segment 88 and a fourth segment 92 extends from the third segment 90, with the third segment providing for a gradual transition between the different dimensions of the second and fourth segments 88, 92. The fourth segment 92 receives the fluid communication with the secondary inlet port 42b of the second cavity 20b.

It can be seen that the second segment 88 has a diameter D2 which is smaller than the diameter D1 of the first segment 86, and smaller than the diameter D3 of the fourth segment 92. In a particular embodiment, the ratio D1/D2 and the ratio D1/D3 are between 1 and 2. In another particular embodiment, the ratio D1/D2 and the ratio D1/D3 are from about 1.5 to about 1.8. Other values are also possible.

The third segment 90 is tapered to define a progressive transition between the different diameters D2 and D3 of the second and fourth segments 88, 92. The outer wall of the third segment 90 extends at an angle α from the outer wall of the fourth segment 92. In a particular embodiment, the angle α is from about 2.5° to about 7.5°. In another particular embodiment, the angle α is from about 3° to about 4°. Other values are also possible.

In the embodiment shown, the fluid communication between the primary inlet port 40a and the second segment 88 is provided through a conduit portion 94 extending at an angle θ with respect to a perpendicular to a central axis C of the second segment 88. In a particular embodiment, the angle θ is from about −45° to about 60°. In another particular embodiment, the angle θ is from about 30° to about 60°. Other values are also possible.

In use, the compressed air is fed into the combustion chambers 32 of the rotary engine 10 in accordance with the following. The compressed air from the plenum 21 is fed through the first conduit 62 and into a combustion chamber of the first cavity 20a through its primary inlet port 40a as the chamber undergoes the intake phase, i.e. as its volume is increasing. Compressed air is also fed to the chamber through the second conduit 64 through its secondary inlet port 40a during the beginning of the intake phase, and optionally the end of the exhaust phase.

After the intake phase, when the maximum volume of the chamber is reached, the compression phase begins and the volume of the chamber of the first cavity 20a is reduced, at first while its primary inlet port 40a remains open. The air overflows out of the first cavity 20a through the open primary inlet port 40a and into the first conduit 62, where it is fed to a combustion chamber of the second cavity 20b through its secondary inlet port 42b, with the chamber of the second cavity 20b being at the end of its exhaust phase or at the beginning of its intake phase. The chamber of the second cavity 20b undergoes the beginning of its intake phase, with its volume increasing, while the air from the first cavity 20a is received through its secondary inlet port 42b. Depending on the relative pressures, air may also be fed from the plenum 21 to the second cavity 20b through the first conduit 62 and secondary inlet port 42b. The communication between the combustion chamber of the first cavity 20a and its primary inlet port 40a is then closed, and the air within the combustion chamber of the first cavity 20a is further compressed during the remainder of the compression phase as the volume of the chamber is reduced to its minimum value.

The intake phase of the chamber of the second cavity 20b continues, and compressed air is fed from the plenum 21 through the second conduit 64 and into the combustion chamber of the second cavity 20b through its primary inlet port 40b. After the intake phase, when the maximum volume of the chamber is reached, the compression phase begins and the volume of the chamber of the second cavity 20b reduces, at first while its primary inlet port 40b remains open. The air overflows out of the second cavity 20b through the open primary inlet port 40b and into the second conduit 64, where it is fed to another combustion chamber of the first cavity 20a through its secondary inlet port 42a, this chamber of the first cavity 20a being at the end of its exhaust phase or at the beginning of its intake phase. This other chamber of the first cavity 20a undergoes the beginning of its intake phase, with its volume increasing, while the air from the second cavity 20b is received through its secondary inlet port 42a. Depending on the relative pressures, air may also be fed from the plenum 21 to the first cavity 20a through the second conduit 64 and secondary inlet port 42a. The communication between the chamber of the second cavity 20b and its primary inlet port 40b is then closed, and the air within the combustion chamber of the second cavity 20b is further compressed until the end of its compression phase as the volume of the chamber is reduced to its minimum value.

Figure 5:
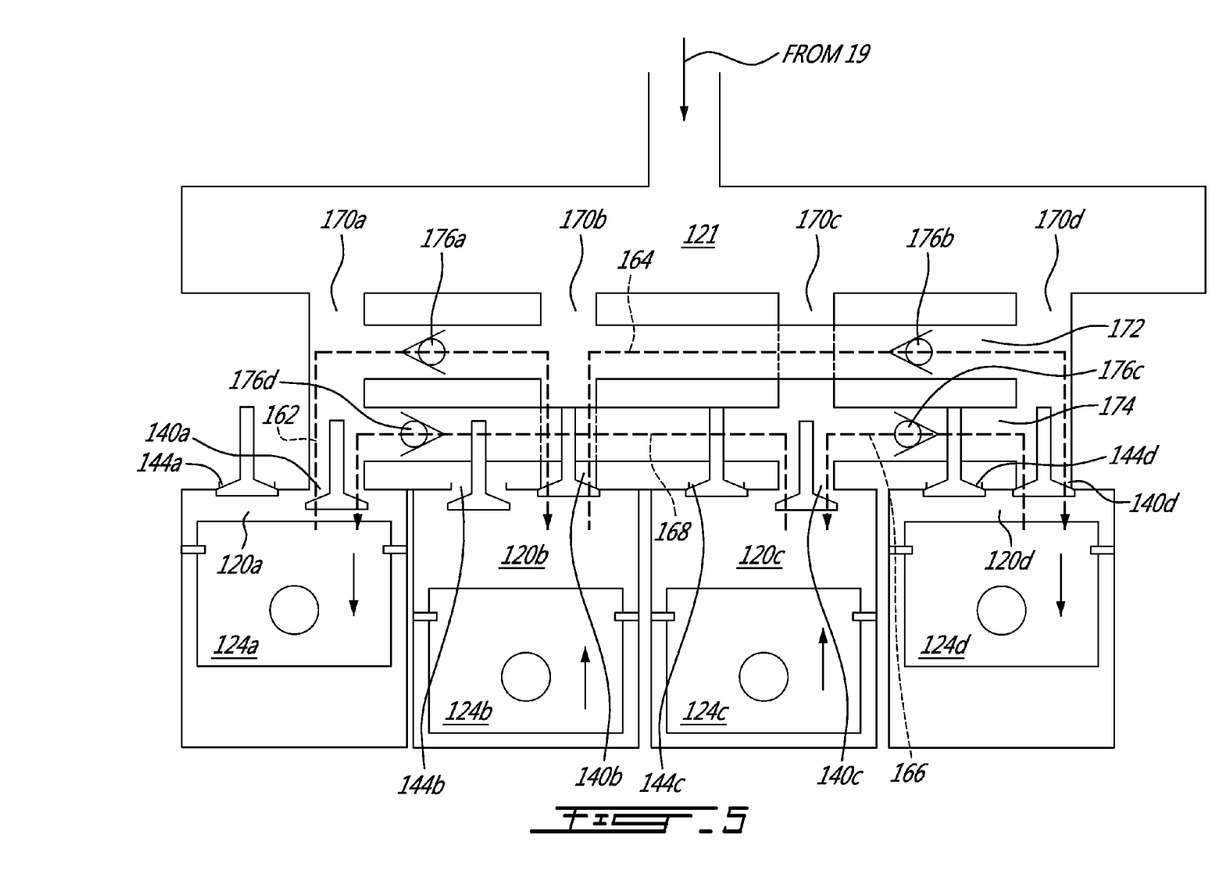
FIG. 5 is a schematic view of connections between the cavities of a reciprocating internal combustion engine which can be used in an engine such as shown in FIG. 1, in accordance with a particular embodiment.

Referring to FIG. 5, a similar connection arrangement between the different cavities of a reciprocating engine 110 is shown. In the embodiment shown, the reciprocating engine 110 includes four cavities 120a,b,c,d each receiving a respective piston 124a,b,c,d to each define a single combustion chamber, and each having a respective inlet port 140a,b,c,d and a respective exhaust port 144a,b,c,d in communication with the combustion chamber. A respective valve selectively allows and prevents the fluid communication between the inlet ports 140a,b,c,d and the respective cavity 120a,b,c,d and between the exhaust ports 144a,b,c,d and the respective cavity 120a,b,c,d.

A plenum 121 receives the compressed air from the turbocharger compressor 19. First, second, third and fourth conduits 162, 164, 166, 168 are defined by different sections of interconnected passages which selectively communicate with each other through one-way valves.

The pistons 124a,b,c,d are engaged to the shaft in an angularly offset manner with each cavity 120a,b,c,d undergoing the beginning of its compression phase with its inlet port open while another cavity undergoes part or all of its intake phase with its inlet port also open. In the embodiment shown, the pistons fire in the following order: first piston 124a, second piston 124b, fourth piston 124d and third piston 124c.

As such, in the embodiment shown, first, second, third and fourth inlet passages 170a,b,c,d extend from a respective one of the inlet ports 140a,b,c,d to the plenum 121. A first transverse passage 172 interconnects the first, second and fourth inlet passages 170a,b,d, while a second transverse passage 174 interconnects the first, third and fourth inlet passages 170a,c,d. A first one-way valve 176a allows a flow in the first transverse passage 172 from the first inlet passage 170a to the second inlet passage 170b while preventing the flow in the opposite direction. A second one-way valve 176b allows a flow in the first transverse passage 172 from the second inlet passage 170b to the fourth inlet passage 170d while preventing the flow in the opposite direction. A third one-way valve 176c allows a flow in the second transverse passage 174 from the fourth inlet passage 170d to the third inlet passage 170c while preventing the flow in the opposite direction. A fourth one-way valve 176d allows a flow in the second transverse passage 174 from the third inlet passage 170c to the first inlet passage 170a while preventing the flow in the opposite direction.

Thus, in the embodiment shown, when the first cavity 120a is at the beginning of its compression phase with the valve of its inlet port 140a remaining open, the second cavity 120b is in its intake phase, with the valve of its inlet port 140b also being open. A first conduit 162 provides for fluid communication between the first inlet port 140a and the second inlet port 140b, as defined by the first inlet passage 170a, the portion of the first transverse passage 172 extending between the first and second inlet passages 170a,b including the first one-way valve 176a, and the second inlet passage 170b. The valves of the third and fourth inlet ports 140c,d are closed and prevent communication of the first conduit 162 with the third and fourth cavities 120c,d.

The second cavity 120b then begins its compression phase with the valve of the second inlet port 140b remaining open, and the fourth cavity 120d is in its intake phase, with the valve of the fourth inlet port 140d also being open. A second conduit 164 provides for fluid communication between the second inlet port 140b and the fourth inlet port 140d, defined by the second inlet passage 170b, the portion of the first transverse passage 172 extending between the second and fourth inlet passages 170b,d including the second one-way valve 176b, and the fourth inlet passage 176d. The valves of the first and third inlet ports 140a,c are closed and prevent communication of the second conduit 164 with the first and third cavities 120a,c.

The fourth cavity 120d then begins its compression phase with the valve of the fourth inlet port 140d remaining open, and the third cavity 120c is in the intake phase, with the valve of the third inlet port 140c also being open. A third conduit 166 provides for fluid communication between the fourth inlet port 140d and the third inlet port 140c, defined by the fourth inlet passage 170d, the portion of the second transverse passage 174 extending between the fourth and third inlet passages 170d,c including the third one-way valve 176c, and the third inlet passage 170c. The valves of the first and second inlet ports 140a,b are closed and prevent communication of the third conduit 166 with the first and second cavities 120a,b.

The third cavity 120c then begins its compression phase with the valve of the third inlet port 140c remaining open, and the first cavity 120a is in the intake phase, with the valve of the first inlet port 140a also being open. A fourth conduit 168 provides for fluid communication between the third inlet port 140c and the first inlet port 140a, defined by the third inlet passage 170c, the portion of the second transverse passage 174 extending between the third and first inlet passages 170c,a including the fourth one-way valve 176d, and the first inlet passage 170a. The valves of the second and fourth inlet ports 140b,d are closed and prevent communication of the fourth conduit 168 with the second and fourth cavities 120b,d.

The conduits 162, 164, 166, 168 are also in communication with the plenum 121 through the inlet passages 170a,b,c,d. In a particular embodiment, the conduits 162, 164, 166, 168 have a Venturi shape as described above.

In an alternate embodiment, the internal combustion engine 10, 110 is a rotary engine with a single inlet port for each cavity, and a communication similar to that described above for the reciprocating engine 110 is provided. An another embodiment, the internal combustion engine 10, 110 is a reciprocating engine with a primary and a secondary inlet port for each cavity, and a communication similar to that described above for the rotary engine 10 is provided.

In a particular embodiment, the conduits 62, 64, 162, 164, 166, 168 which allow circulation of the air expelled from each cavity 20a,b, 120a,b,c,d at the beginning of the compression phase of each chamber into a chamber of another cavity 20a,b, 120a,b,c,d simultaneously undergoing its intake phase allow for a reduction of the pressure losses which may otherwise be associated with the use of the Miller cycle in an internal combustion engine.

In a particular embodiment, the internal combustion engine 10,110 is a premix engine where the fuel is for example gasoline, and the fuel may be injected in the inlet port; in this case, the air circulated between the inlet ports may also include fuel mixed therewith.

The above description is meant to be exemplary only, and one skilled in the art will recognize that changes may be made to the embodiments described without departing from the scope of the invention(s) disclosed. Modifications which fall within the scope of the present invention will be apparent to those skilled in the art, in light of a review of this disclosure, and such modifications are intended to fall within the appended claims.

The invention claimed is:

1. An internal combustion engine comprising:
   at least two rotatable bodies;
   an outer body defining at least two internal cavities each sealingly and rotationally receiving therein a respective one of the at least two rotatable bodies to each define at least one combustion chamber of variable volume undergoing a cycle defining successive phases of intake, compression, combustion and exhaust;
   for each of the at least two internal cavities;
     a primary inlet port in successive fluid communication with each of the at least one combustion chamber during the intake phase thereof and a beginning portion of the compression phase thereof,
     a secondary inlet port in successive fluid communication with each of the at least one combustion chamber during at least a beginning portion of the intake phase thereof, and
     at least one exhaust port in successive fluid communication with each of the at least one combustion chamber during the exhaust phase thereof;
   a rotatable shaft, the at least two rotatable bodies being drivingly engaged to the rotatable shaft in an angularly offset manner;

a plenum for receiving pressurized air; and a plurality of conduits in fluid communication with the plenum, each of the plurality of conduits defining a fluid communication between the primary inlet port of a first respective one of the internal cavities and the secondary inlet port of a second respective one of the internal cavities;

wherein the at least two rotatable bodies are angularly offset such that for each of the plurality of conduits, each of the at least one combustion chamber of the first respective one of the internal cavities undergoes the beginning portion of the compression phase simultaneously with a respective one of the least one combustion chamber of the second respective one of the internal cavities undergoing the beginning portion of the intake phase.

2. The engine as defined in claim 1, wherein the secondary inlet port is also in fluid communication with each of the at least one combustion chamber during an end of the exhaust phase thereof, the at least two rotatable bodies being angularly offset such that for each of the plurality of conduits, each of the at least one combustion chamber of the first respective one of the internal cavities undergoes the beginning portion of the compression phase simultaneously with the respective one of the least one combustion chamber of the second respective one of the internal cavities also undergoing the end of the exhaust phase.

3. The engine as defined in claim 1, wherein the at least two rotatable bodies include at least one pair of first and second rotors, with a first one of the plurality of conduits providing a fluid communication between the primary inlet port of the first rotor and the secondary inlet port of the second rotor of the same pair, and a second one of the plurality of conduits providing a fluid communication between the primary inlet port of the second rotor and the secondary inlet port of the first rotor of the same pair.

4. The engine as defined in claim 1, wherein each of the plurality of conduits has first, second, third and fourth successive segments each having a circular cross-section, the first segment extending from the plenum, the fluid communication with the primary inlet port being defined in the second segment, and the fluid communication with the secondary inlet port being defined in the fourth segment, a diameter of the second segment being smaller than a diameter of the first segment and than a diameter of the fourth segment.

5. The engine as defined in claim 4, wherein a ratio between the diameter of the first segment and the diameter of the second segment and a ratio between the diameter of the fourth segment and the diameter of the second segment are between 1 and 2.

6. The engine as defined in claim 4, wherein the third segment defines a tapered transition between the second and fourth segments, an outer wall of the third segment forming an angle of from about 2.5° to about 7.5° with an outer wall of the fourth segment.

7. The engine as defined in claim 4, wherein the fluid communication between the primary inlet port and the second segment is provided through a conduit extending at an angle of from about −45° to about 60° with respect to a line perpendicular to a central axis of the second segment.

8. The engine as defined in claim 1, wherein each of the at least two internal cavities is defined by two axially spaced apart end walls and a peripheral wall extending between the end walls, and each of the at least two rotatable bodies is a rotor body rotatable within the respective one of the at least two internal cavities in sealing engagement with the peripheral and end walls defining a plurality of combustion chambers of variable volume.

9. The engine as defined in claim 8, wherein each of the at least two internal cavities defines an epitrochoid shape with two lobes, and each rotor body has three circumferentially spaced apex portions, and the plurality of combustion chambers includes three rotating chambers of variable volume, the rotor body being engaged to an eccentric portion of the shaft to rotate and perform orbital revolutions within the respective one of the at least two internal cavities with each of the apex portions remaining in sealing engagement with the peripheral wall and separating the chambers.

10. A system comprising:
a turbocharger having a compressor;
a rotary internal combustion engine having:
    at least two rotors,
    an outer body defining:
        at least two internal cavities each sealingly and rotationally receiving therein a respective one of the at least two rotors to define a plurality of combustion chambers of variable volume each undergoing a cycle defining successive phases of intake, compression, combustion and exhaust,
        for each of the at least two internal cavities:
        a primary inlet port in successive fluid communication with each of the combustion chambers during the intake phase thereof and a beginning portion of the compression phase thereof,
        a secondary inlet port in successive fluid communication with each of the combustion chambers during a secondary portion of the cycle, the secondary portion of the cycle including at most a beginning of the intake phase and an end of the exhaust phase of the combustion chamber, and
        an exhaust port in successive fluid communication with each of the combustion chambers of the respective internal cavity during the exhaust phase thereof;
    a rotatable shaft, the rotors being drivingly engaged to the rotatable shaft in an angularly offset manner;
a plenum in fluid communication with the compressor; and
a plurality of conduits in fluid communication with the plenum, each of the plurality of conduits providing a fluid communication between the primary inlet port of a first respective one of the at least two internal cavities and the secondary inlet port of a second respective one of the at least two internal cavities;
wherein the at least two rotors are angularly offset around the rotatable shaft such that for each of the plurality of conduits, each of the combustion chambers of the first respective one of the internal cavities undergoes the beginning portion of the compression phase simultaneously with a respective one of the chambers of the second respective one of the internal cavities undergoing at least part of the secondary portion of the cycle;
whereby each of the plurality of conduits allows for compressed air overflowing from the primary inlet port of the first respective one of the internal cavities during the beginning portion of the compression phase of each of the at least one combustion chamber thereof to be fed into the secondary inlet port of the second respective one of the internal cavities during the secondary portion of the cycle of each of the at least one combustion chamber thereof.

11. The system as defined in claim 10, wherein the rotors are drivingly engaged to the rotatable shaft in an angularly offset manner such that for each of the plurality of conduits, each of the combustion chambers of the respective one of the internal cavities undergoes the beginning portion of the compression phase simultaneously with a respective one of the combustion chambers of the different respective one of the internal cavities undergoing the beginning of the intake phase.

12. The system as defined in claim 10, wherein the rotors include at least one pair of first and second rotors, with a first one of the plurality of conduits providing a fluid communication between the primary inlet port of the first rotor and the secondary inlet port of the second rotor of the same pair, and a second one of the plurality of conduits providing a fluid communication between the primary inlet port of the second rotor and the secondary inlet port of the first rotor of the same pair.

13. The system as defined in claim 10, wherein each of the at least two internal cavities defines an epitrochoid shape with two lobes, and each of the at least two rotors has three circumferentially spaced apex portions, and the plurality of combustion chambers includes three rotating chambers of variable volume, the rotor being engaged to an eccentric portion of the shaft to rotate and perform orbital revolutions within the respective one of the at least two internal cavities with each of the apex portions remaining in sealing engagement with the peripheral wall and separating the chambers.

14. The system as defined in claim 10, wherein each of the plurality of conduits has a first, second, third and fourth successive segments each having a circular cross-section, the first segment extending from the plenum, the fluid communication with the primary inlet port being defined in the second segment, and the fluid communication with the secondary inlet port being defined in the fourth segment, a diameter of the second segment being smaller than a diameter of the first segment and than a diameter of the fourth segment.

15. The system as defined in claim 14, wherein a ratio between the diameter of the first segment and the diameter of the second segment and a ratio between the diameter of the fourth segment and the diameter of the second segment are between 1 and 2.

16. The system as defined in claim 14, wherein the third segment defined a tapered transition between the second and fourth segments, an outer wall of the third segment forming an angle of from about 2.5° to about 7.5° with an outer wall of the fourth segment.

17. The system as defined in claim 14, wherein the fluid communication between the primary inlet port and the second segment is provided through a conduit extending at an angle of from about −45° to about 60° with respect to a perpendicular to a central axis of the second segment.

* * * * *